United States Patent Office 3,758,505
Patented Sept. 11, 1973

3,758,505
ANTHRAQUINONE DYES CONTAINING N-METHYLENELACTAM
Charles H. Chang, Piscataway, N.J., assignor to GAF Corporation, New York, N.Y.
No Drawing. Filed Apr. 16, 1971, Ser. No. 134,852
Int. Cl. C07d 27/08
U.S. Cl. 260—326.5 C                     4 Claims

ABSTRACT OF THE DISCLOSURE

New anthraquinone compounds having an aryl radical bearing an N-methylenelactam substituent thereon. These compounds are used as dyes with excellent light and sublimation fastness for textile fibers such as polyesters.

---

This invention relates to a new class of anthraquinone compounds. More particularly, it relates to anthraquinones containing N-methylenelactam and their use as dyestuffs for natural and synthetic fibers.

The new compounds of the present invention are represented by the following Formula I:

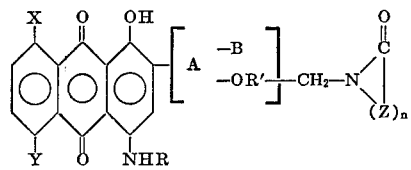

(I)

wherein X and Y are —OH or —NHR, but are not the same, R is hydrogen, lower alkyl, hydroxy lower-alkyl or cycloalkyl, R' is hydrogen, lower alkyl, phenyl or naphthyl, A is aryl of up to two carbocyclic rings, e.g., phenyl and naphthyl, B is hydrogen, hydroxy, —OR, —NR$_2$, —SR or halogen, Z is methylene which may be substituted with lower alkyl or halogen and $n$ is a whole number between 3 and 6 inclusive.

Compounds of this invention are prepared by reacting an N-methylol-lactam (II) with a 1-hydroxy-2-aryl anthraquinone (III) in accordance with the following Equation A:

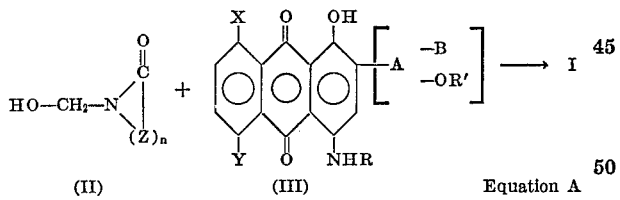

Equation A wherein X, Y, R, A, B, R', Z and $n$ are as defined above. The reaction is generally conducted in acid such as concentrated sulfuric, polyphosphoric or acetic acid, with concentrated sulfuric acid being preferred, and under moderate to low temperature conditions (—10° to 50° C.). The N-methyl lactam group adds onto the aryl radical of the anthraquinone. When the 2-aryl group "A" of the starting anthraquinone is substituted by an aryloxy radical (i.e., when R' is phenyl or naphthyl), the 2-methylenelactam group may add onto both the A and R' aryl moieties. When diluted with water, the product forms as a precipitate which can be isolated by filtration and then washed.

Among the anthraquinones which are suitable as starting materials are 2 - (p-methoxyphenyl)-4,8-diaminoanthrarufin, 2 - (p-hydroxyphenyl)-4-methylamino-8-aminoanthrarufin, 2 - (p-phenoxyphenyl) - 4-(β-hydroxyethylamino)-chrysazine, 2-(2',4'-dihydroxyphenyl)-4-amino-5-methylamino-chrysazine, 2 - (4'-ethoxynaphthyl-1)-4,8-diaminoanthrarufin, 2 - (2' - hydroxy-4'-ethoxyphenyl)-4-cyclohexylamino-5-chrysazine, 2-(2',4'-dimethoxyphenyl)-4,8 - diaminoanthrarufin, 2 - (2'-methylmercapto-4'-methoxyphenyl) - 4,5-diaminochrysazine, 2-(2'-methoxy-4'-chloronaphthyl-1)-4,8-diaminoanthrarufin, 2-(4'-methoxynaphthyl - 1)-4,5-diaminochrysazine and 2-(p-methoxybiphenyl)-4,8-diaminoanthrarufin.

Among the suitable N-methylol lactams which can be used to produce the anthraquinones of Formula I are N-methylolpyrrolidone, N-methyl-δ-valerolactam, N-methylol-ε-caprolactam, and their alkyl and/or halo-substituted derivatives.

The N-methylene lactam anthraquinones of the present invention are useful for dyeing natural and synthetic fibers in strong bright blue shades and they give dyeings having excellent light fastness and sublimation fastness. Among the fibers which are advantageously dyed with the compounds of Formula I are wool, polyamides, polyesters and polyacrylonitriles. The high degree of sublimation fastness characterising the compounds of the present invention makes them particularly useful for dyeing permanent press fabrics which are normally subjected to high temperatures in order to impart the permanent press quality thereto. Dyes can be applied to the fibers by conventional padding and batch dyeing techniques.

The following examples are presented to illustrate the spirit, but not to limit the scope of the invention.

EXAMPLE 1

To a flask containing 10 g. of 2-(4'-methoxyphenyl)-4,8-diaminoanthrarufin dissolved in 220 ml. of 86% sulfuric acid, at 50° C., is added gradually 2.8 g. of N-methylolpyrolidone. The mixture is allowed to stand at 30° C. for 15 hours and drowned in 1.5 l. of cold water with stirring. The precipitate is collected by filtration, washed with water, sodium carbonate solution and finally with water till colorless to give the product in good yield. The product has the following structure:

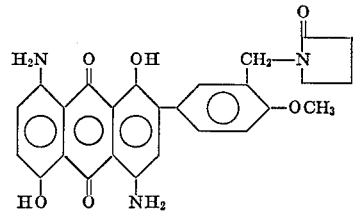

A dispersed paste was used to dye polyester fiber in royal blue shade with excellent light and sublimation fastness.

EXAMPLE 2

The process of Example 1 was repeated using N-methylol-ε-caprolactam instead of N-methylolpyrrolidone to give the product of the following structure:

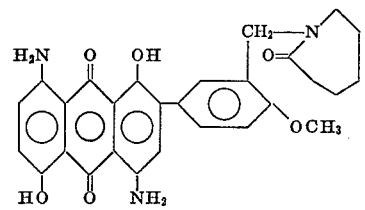

A dispersed paste of this product dyes nylon in blue shades.

EXAMPLE 3

The process of Example 1 was followed except that 3,3,4,4-tetrachloro-N-methylolpyrrolidone and 2-(p-phenoxyphenyl)-4,5-di(N-methylolamino) chrysazine were used giving a product of the following structure:

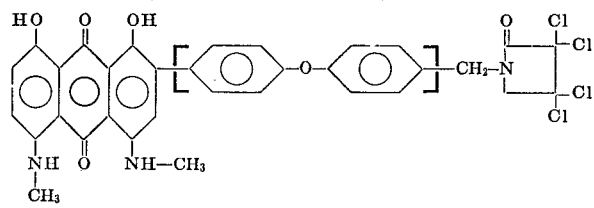

A dispersed paste prepared from the above product dyes polyester fibers in bright blue shades.

EXAMPLE 4

The procedure of Example 1 is followed using 2-(2'-hydroxynaphthyl)-4,8-diaminoanthrarufin instead of 2-(4'-hydroxyphenyl)-4,8-diamino-anthrarufin to yield the following product which dyes polyester fibers in blue shades:

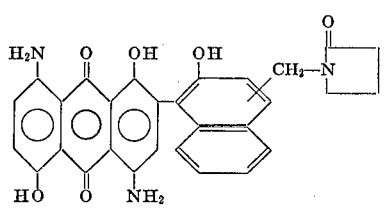

EXAMPLE 5

The procedure of Example 1 is followed using 2-(4'-hydroxyphenyl)-4,8-bis-(ethylamino)anthrarufin instead of 2-(4'-hydroxyphenyl)-4,8-diaminoanthrarufin to give the following product which dyes polyesters in blue shades:

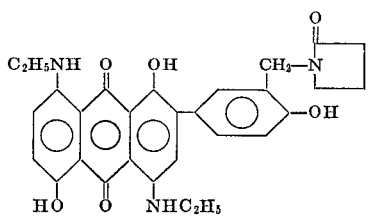

What is claimed is:
1. A compound of the formula:

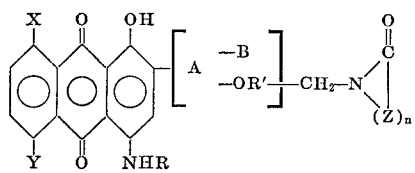

wherein one of X or Y is OH and the other is NHR, R is H, methyl, ethyl, hydroxyethyl or cyclohexyl, R' is H, methyl, ethyl or phenyl, A is phenyl, naphthyl or biphenyl, B is OH, oxymethyl, oxyethyl, thiomethyl or chloro, Z is methylene optionally substituted by chloro, and $n$ is 3.

2. The compound of claim 1 having the structure:

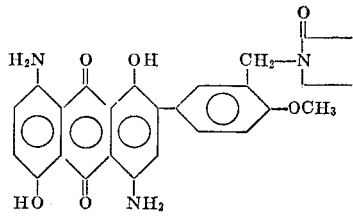

3. The compound of claim 1 having the structure:

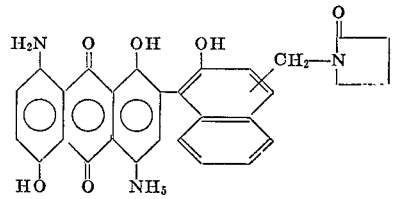

4. The compound of claim 1 having the structure:

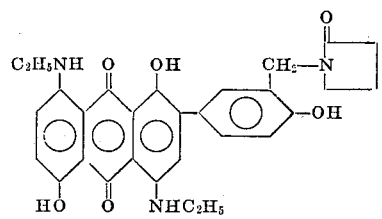

References Cited
UNITED STATES PATENTS
3,184,455   5/1965   Neeff _____ 260—243

JOSEPH A. NARCAVAGE, Primary Examiner

U.S. Cl. X.R.
260—239.3 T, 293.62, 326.5 S; 8—39